United States Patent [19]

Hojo

[11] 4,451,990

[45] Jun. 5, 1984

[54] GYROCOMPASS

[75] Inventor: Takeshi Hojo, Kuroiso, Japan

[73] Assignee: Kabushiki Kaisha Tokyo Keiki, Tokyo, Japan

[21] Appl. No.: 367,465

[22] Filed: Apr. 12, 1982

[30] Foreign Application Priority Data

Apr. 15, 1981 [JP] Japan .................. 56-56797

[51] Int. Cl.³ .............................. G01C 19/38
[52] U.S. Cl. ........................... 33/327; 74/5.6 D
[58] Field of Search .............. 33/324, 327, 317 B, 33/325, 330, 326, 344, 318; 74/5.6 D

[56] References Cited

U.S. PATENT DOCUMENTS 3,855,711 12/1974 Kawada et al. .................. 33/327
3,935,644 2/1976 Kawada et al. .................. 33/324
4,075,764 2/1978 Krogmann et al. ............... 33/324

Primary Examiner—William D. Martin, Jr.
Attorney, Agent, or Firm—Hill, Van Santen, Steadman & Simpson

[57] ABSTRACT

In a gyrocompass in which a gyro is housed in a gyro case with a spin axis arranged substantially horizontal, a container is provided for surrounding the gyro case and for containing a liquid. A suspension wire supports the gyro case within the container and a supporting device is provided to support the case with three degrees of freedom. A vertical follow-up device ensures that the container follows the gyro case around a vertical axis. A detector supplies a detected signal to the follow-up device to produce a follow-up error responsive to displacement and twisting of the suspension wire so that a damping torque is applied to the gyro case. A delay element supplies the detected signal to the follow-up device to produce a follow-up error therein.

1 Claim, 10 Drawing Figures

GYROCOMPASS

BACKGROUND OF THE INVENTION

1. Field of the Invention

The present invention relates to a gyrocompass and is directed more particularly to an improvement of a gyrocompass such as disclosed in the Japanese Patent No. 885,731 (title of the invention is gyro apparatus).

2. Description of the Prior Art

In a prior art gyrocompass, when a vertical axis torque or damping torque is produced for the gyro of the gyrocompass, a viscosity torque is also applied to the gyro as an external disturbance torque. Since this viscosity torque is of a differential type, the external disturbance caused by the acceleration of a relatively high frequency such as when a ship makes a turning motion affects badly on the damping system of the gyrocompass to cause a particularly large angular deviation between the gyro case and the container, producing a horizontal error. Although this horizontal error is attenuated by the damping action inherent to the gyrocompass itself, in such process, it continues to produce the azimuth error over a long time period.

OBJECTS AND SUMMARY OF THE INVENTION

Accordingly, it is an object of the present invention to provide a gyrocompass which can obviate the aforesaid defects by adding a compensating apparatus with a simple construction thereto.

It is another object of the present invention to provide a gyrocompass which can remove an influence of acceleration external distrubance caused by a turning and an increase and/or decrease of a velocity of a ship and so on.

In accordance with the invention, a gyro case houses a gyro, a spin axis of which is arranged substantially horizontal. A container surrounds the gyro case and contains a liquid. A suspension wire supports the gyro case within the container. A supporting device supports the container with three degrees of freedom. A vertical follow-up device makes the container follow the gryo case around a vertical axis. A displacement of the gyro case to north and south directions relative to the container is detected, a detected signal is supplied to the vertical follow-up device to produce a follow-up error responsive to the displacement, and the suspension wire is twisted in accordance with the follow-up error so that a damping torque is applied to the gyro case. A first order delay element supplies the north and south displacement detected signal to the vertical follow-up device to produce a follow-up error therein. A time constant of the first order delay element is selected substantially equal to a ratio between a viscosity torque constant around a vertical axis of the container and the gyro case and a torque spring constant of the suspension wire. The first order delay element comprises an operational amplifier, an input resistance, and a feedback circuit. The feedback circuit is formed of a resistance and a capacitance connected in parallel, the feedback circuit being connected between the output terminal of the operational amplifier and an inverted input terminal thereof.

The other objects, features and advantages of the present invention will become apparent from the following description taken in conjunction with the accompanying drawings through which the like references designate the same elements and parts.

DESCRIPTION OF THE PREFERRED EMBODIMENT

To facilitate the better understanding of the gyrocompass according to the present invention, let us first describe the prior art gyrocompass to which the invention is applied with reference to the Japanese Patent (specification No. 885,731)prior to the detailed description of the present invention.

Figure 1:
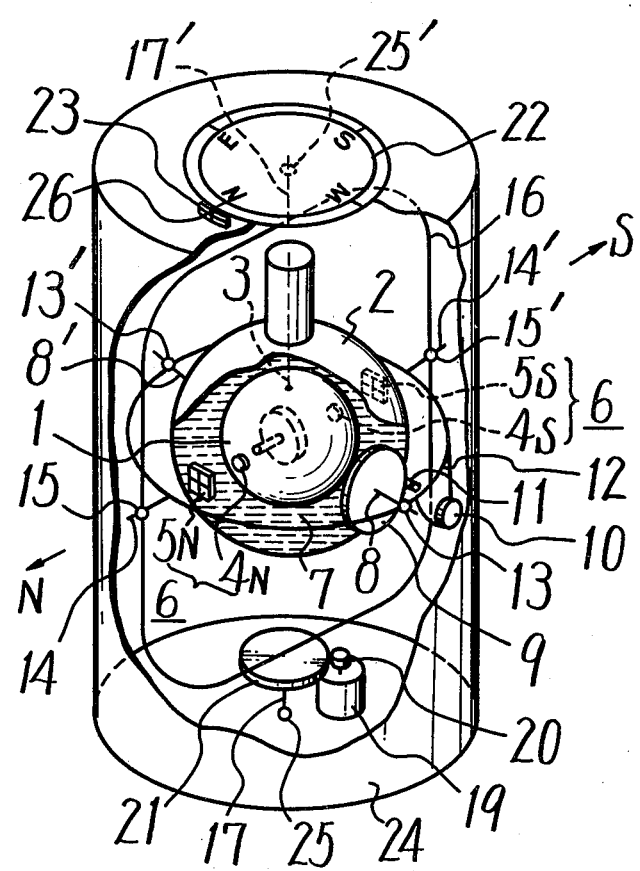
FIG. 1 is a perspective view of a gyrocompass to which the present invention is applied whose one portion is cut away to see.

In FIG. 1, reference numeral 1 denotes a gyro case for accommodating within it a gyro rotor rotatable at high speed, which is constructed as a liquid-tight structure, 2 a container or receptacle formed like a tank to surround therein the gyro case 1 and 3 denotes a suspension wire for supporting or suspending the gyro case 1, an upper end of which is fixed to the container 2 and a lower end which is secured to the gyro case 1, respectively.

Numerals 4N, 4S and 5N, 5S each designate primary and secondary sides of a non-contact displacement detection apparatus 6, in which the primary sides 4N and 4S are respectively attached to, for example, intersecting points on an external surface of the gyro case 1 to which a spin axis of the gyro is extended, that is, north and south sides of the gyro, while the secondary sides 5N and 5S are attached to the positions responsive to the primary sides 4N and 4S on the container 2. Numeral 7 represents a liquid or oil like a damping oil with high viscosity, which is charged or sealed into the container 2. At the positions (east and west) perpendicular to the spin axis of the gyro on equator of the container 2 is located each end of a pair of horizontal shafts 8 and 8' and another each end thereof is rotatably engaged with bearings 13 and 13' provided at the positions corresponding to each other in a horizontal ring 12. Numeral 10 denotes a horizontal follow-up servo motor, which is attached to the horizontal ring 12. To one horizontal shaft 8 is attached a horizontal gear 9 arranged to be rotatably meshed with a horizontal pinion 11 fixed to the rotary shaft of the servo motor 10. At the positions perpendicular to the horizontal shaft bearings 13 and 13' mentioned previously in the horizontal ring 12 are attached gimbal shafts 14 and 14′, which are rotatably engaged with gimbal shaft bearings 15 and 15′ placed at the corresponding position on a follow-up ring 16. At the top and bottom of the follow-up ring 16 are located follow-up shafts 17 and 17′, free end portions of which are rotatably engaged with follow-up shaft bearings 25 and 25′ provided at the positions responsive to one another in binnacle 24. An azimuth gear 21 is attached to one follow-up shaft 17. An azimuth follow-up servo motor 19 is installed on the binnacle 24 and an azimuth pinion 20 is attached to the rotary shaft thereof, which is rotatably meshed with the azimuth gear 21. Numeral 22 designates a compass card which is secured to the follow-up shaft 17′. Numeral 23 represents a lubber line plate or board attached to the upper plane of the binnacle 24 in such a manner as to correspond to the compass card 22 where a course of a ship or vehicle equipped with the conventional gyrocompass is read out by the cooperation of a lubber line 26 drawn on the central portion thereof and the compass card 22.

Figure 2:
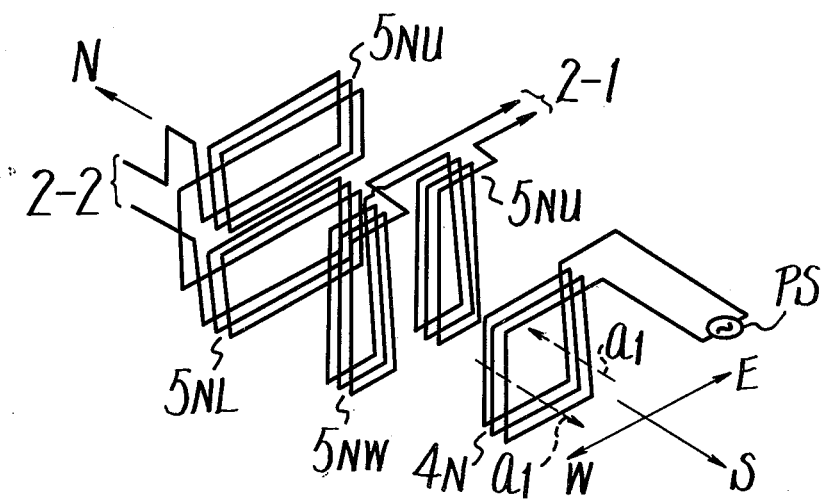
FIG. 2 is a wiring view of a non-contact displacement detection apparatus used in the gyrocompass shown in FIG. 1.

Next, one practical example of the aforesaid non-contact displacement detection apparatus 6 will be described with reference to FIGS. 2 and 3. FIG. 2 describes a case in which a pair of N (north) sides are taken out therefrom. As shown in the figure, the primary side 4N is formed of a single primary rectangular coil whose winding is in the plane perpendicular to the spin axis of the gyro, which is ordinarily energized by the alternating current commonly used for a gyro power supply PS thereby to form AC magnetic fields respectively illustrated by broken arrows $a_1$ and $a_1$. The secondary side 5N is likewise comprised of four rectangular coils 5NW, 5NE, 5NU and 5NL in which a pair of coils 5NW and 5NE are arranged in parallel in the horizontal direction and another pair of coils 5NL and 5NU are arranged in the vertical direction. The pairs of coils 5NW, 5NE and 5NU, 5NL are connected to each other at their portions the windings are started.

Now, let us consider a case wherein the primary side coil 4N, namely the gyro case 1 is positioned in the center of the secondary side coil 5N, namely, the container 2. Since the magnetic flux oriented from the primary coil 4N is likewise passed through the four secondary coils 5NW, 5NE, 5NU and 5NL, voltages are correspondingly induced in the respective four coils. But, since the pairs of the coils each are differentially coupled to one other as depicted above, no voltages are produced across their output terminals 2-1 and 2-2. Also, let us consider another case, for example, in which the primary coil 4N is displaced in the east (shown by arrow E in FIG. 2), the magnetic flux passing through the coil 5NE is increased while the magnetic flux passing through the coil 5NW is decreased, so that the voltage is produced across the output terminal 2-1.

On the other hand, when the primary coil 4N is displaced in the west (shown by arrow W in FIG. 2), contrary to the above case, the induced voltage in the coil 5NW is increased but instead, the induced voltage in the coil 5NE is decreased thereby to produce at the output terminal 2-1 the voltage with the phase opposite to that produced when the primary coil 4N is displaced in the east. In this case, the coils 5NU and 5NL are located in the vertical direction, so that no voltage is produced across the output terminal 2-2 thereof.

On the other hand, with respect to the displacement in the vertical direction of the primary coil 4N, since no voltage is produced at the output terminal 2-1 of the coils 5NW and 5NE which are disposed in the horizontal direction, but there produces a difference between the voltages generated respectively in the coils 5NL and 5NU which are placed in the vertical direction, by which output voltage is generated across the output terminal 2-2 thereof. In other words, by the construction shown in FIG. 2, it is possible that the displacement of the N end of the gyro case 1 in the east-west and vertical directions relative to the container 2 can be detected.

Figure 3:
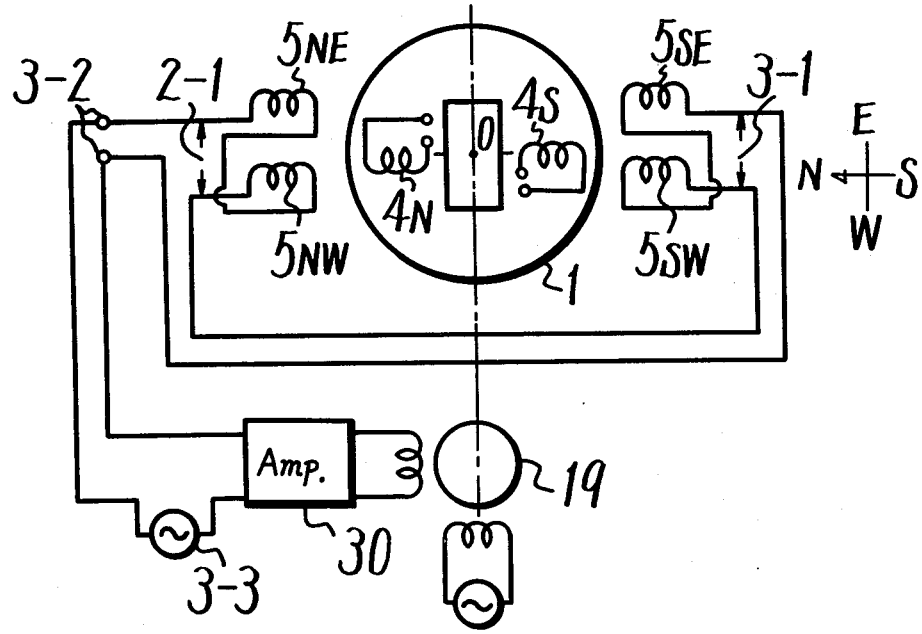
FIG. 3 is a schematic view of the vertical follow up system of the gyrocompass.

FIG. 3 is an arrangement representation schematically showing a detection apparatus for detecting the displacement in only the east-west direction wherein the gyro case 1 is viewed from the top thereof. More specifically, the displacement detection apparatus in the S (south) side is comprised of a primary side coil 4S, secondary side coils 5SE and 5SW wherein when the gyro case 1 is displaced in the eastward, the magnetic flux passed through the coil 5SE is increased, but the magnetic flux in the coil 5SW is decreased to thereby induce the voltage across its terminal 3-1, the phase and amplitude of which are arranged same as those of the voltage produced across the terminal 2-1 of the coils 5NW and 5NE mentioned above. Also, since the coils 5SE, 5SW and 5NE, 5NW are differentially connected to one other, no voltage is generated across a terminal 3-2 relative to the displacement of the east to west direction of the gyro case 1. When the gyro case 1 produces angular displacement around a vertical axis line O (perpendicular to the sheet of the drawing), across the terminal 3-2 is produced an output voltage whose phase is inverted by 0° or 180° in accordance with the rotational direction thereof. This output voltage is applied to a control winding of the azimuth servo motor 19 through or not through a servo amplifier 30. The rotation of the servo motor 19 is transmitted to the container 2 by way of the azimuth pinion 20, the azimuth gear 21, the follow-up ring 16 and the horizontal ring 12, so that the container 2 is controlled to allow the angular displacement around the afore-described vertical axis line O to be made zero. In other words, whatever azimuth the gyro case 1 may take, no twisting force is caused at all upon the suspension wire 3 on account of the action of the servo system as mentioned above, by which any kind of external disturbance torque is never applied to the gyro at its vertical axis line O. In this case, as illustrated in FIG. 3, numeral 3-3 designates an error correcting signal generating apparatus which is provided for generating the voltage responsive to a speed of ship or a latitude, so that the follow-up position of the azimuth follow-up system is displaced and the suspension wire 3 is twisted whereby the torque is applied to the gyro around its vertical axis line O so as to correct the error.

Figure 4:
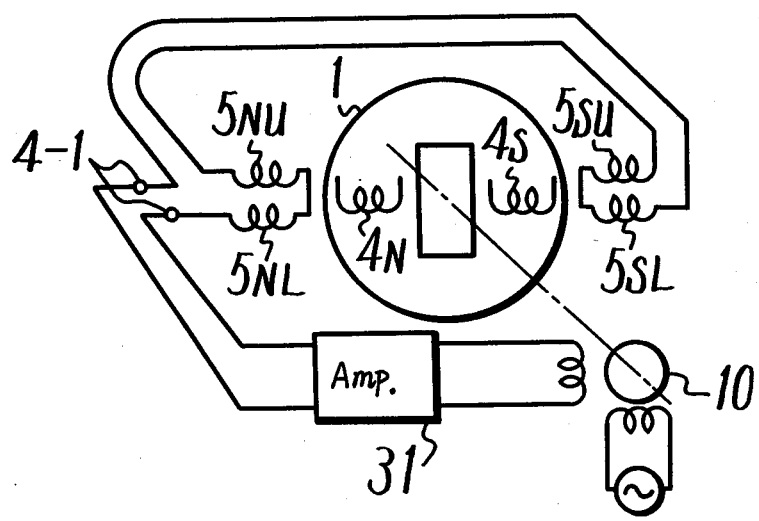
FIG. 4 is a schematic view of the horizontal follow-up system of the gyrocompass.

FIG. 4 schematically shows the horizontal follow-up system of the prior art in which the coils 5NU, 5NL and 5SU, 5SL each composing the secondary pick up 5N and 5S are connected to one another differentially in the same manner as described before. For this reason, although across its terminal 4-1 is produced no output voltage when the gyro case 1 is moved in parallel in the vertical direction of the container 2, the voltage is produced across the terminal 4-1 with respect to the angular movement of the gyro case 1 around the horizontal axis, which is applied to the control winding of the horizontal follow-up servo motor 10 through or not through a servo amplifier 31. The rotation of the horizontal follow-up servo motor 10 is transmitted to rotate the container 2 through the horizontal pinion 11 and the horizontal gear 9, so that the angular displacement of the container 2 as set forth above is made zero.

Figure 5:
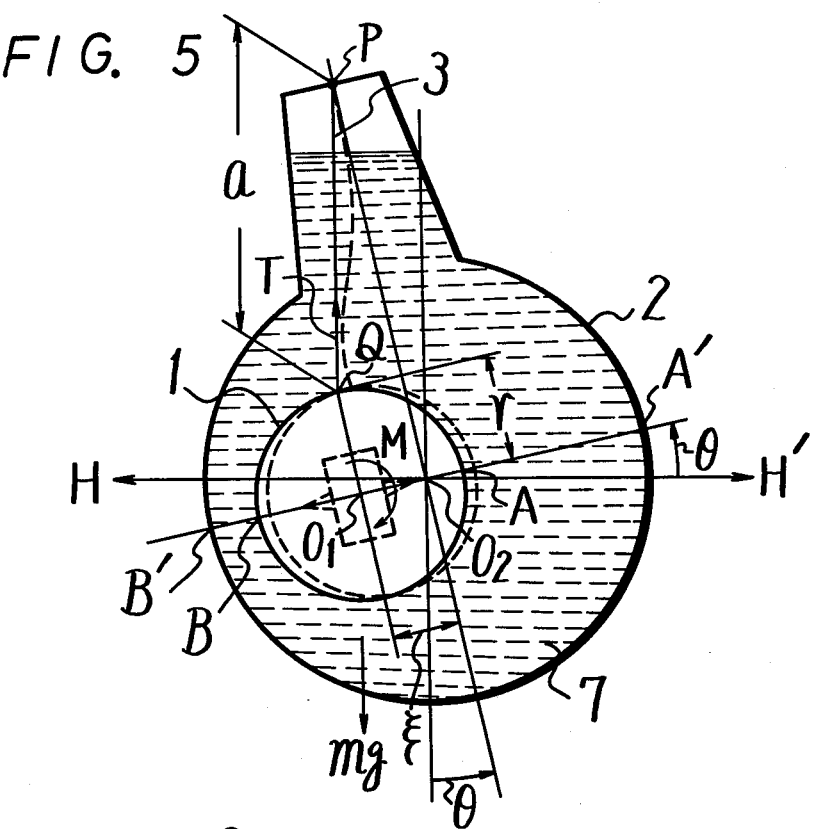
FIG. 5 is a schematic view of the inside of the container which is used to explain the north-seeking principle of the gyrocompass.

FIG. 5 is a representation schematically showing the inside of the container 2 wherein a north-seeking end A on the extend line of the spin axis of the gyro within the gyro case 1 is raised higher only by an angle $\theta$ relative to a horizontal plane H—H'. In this case, $O_1$ designates the centre of the gravity of the gyro case 1, Q designates the coupling point of the lower end of the suspension wire 3 and the container 2, P the coupling point of the upper end of the suspension wire 3 and the container 2, $O_2$ the center of the container 2 and it is assumed that when the spin axis of the rotor within the gyro case 1 is horizontal ($\theta=0$), the $O_1$ and $O_2$ are arranged to be coincident with one other. Also, if reference letter A is given as the north-seeking end and B is given as a point on the gyro case 1 which is deviated by 180° from the north-seeking end A, letters A' and B' each are represented by the points on the container 2 corresponding to the aforesaid points A and B. Then, since the suspension wire 3 presents a deflection curve as shown by a chain line in FIG. 5 due to the fact that the suspension wire 3 has a flexural rigidity in practice, it is natural that axial direction movement $\xi$ ($O_2$ to $O_1$) of the gyro case 1 against the container 2 ought to be reduced by an extremely little amount. But, such influence is quite small in the practical designing, so that the description will be forwarded assuming that the suspension wire 3 is perfectly flexible.

As previously described, since the points A' and B' on the container 2 and the points A and B on the gyro case 1 are always coincided with each other, the container 2 is urged to be inclined only by the angle $\theta$ relative to the horizontal plane H—H' in a manner same as the gyro case 1. Now, premising that any external acceleration is not applied thereto, since no external force is active for the spin axis direction of the gyro case 1, the suspension wire 3 is coincided with the vertical line. If the tension of the suspension wire 3 is represented by T and a remaining weight of the gyro case 1 excluding the buoyancy caused by the damping oil 7 within the gyro case 1 is represented by mg, the tension T of the suspension wire 3 produces a moment M around the point $O_1$, which can be expressed as follows.

$$M = Tr \sin \theta = mg \, r \sin \theta$$

This moment M is applied around the horizontal axis (which is passed through the point $O_1$ and perpendicular to the sheet of the drawing) of the gyro as the torque thereof. In this case, as illustrated in FIG. 5, reference letter r represents the distance between the center of the gravity $O_1$ of the gyro case 1 and the coupling point Q of the suspension wire 3 with the gyro case 1. Also, reference letter g denotes an acceleration of gravity of the earth. That is, according to the method thus discussed, since "the torque in proportion to the inclination of the spin axis against the horizontal plane can be applied around the horizontal axis of the gyro" and if the distance r, the remaining weight mg and the angular momentum of the gyro are properly selected so as to make the period of the north-seeking movement thereof several tens to one hundred and several tens of minutes, it is possible to achieve the gyrocompass as it is intended. Practically, on account of the flexural rigidity of the suspension wire 3, the preceding description is considered as equivalent to that the aforedescribed distance r is lengthened quite slightly longer than the practical distance between the $O_1$ and Q.

Next, a description will be given to a damping action control apparatus of gyrocompasses which is particularly effective for use in the gyrocompass with the construction as set forth above. Its fundamental principle is "to apply the torque in proportion to the inclination of the spin axis against the horizontal plane around the vertical axis of the gyro", which is utilized in many prior art gyrocompasses. When the spin axis of the gyro with the arrangement as described with reference to FIGS. 1 through 5 is inclined only by the angle $\theta$ against the horizontal plane H—H', the container 2 is inclined by the action of the horizontal follow-up system only with the angle $\theta$ same as that of the gyro within the gyro case 1, by which the gyro case 1 is moved to the direction of B'0 by an amount of $O_1 - O_2 = \xi$ and then stands still until the suspension wire 3 becomes coincident with the vertical line. That is, the angle $\theta$ at which the gyro is inclined is in a perfectly proportional relation to the movement amount $\xi$ in the spin axis direction of the gyro case 1 relative to the container 2. Accordingly, by detecting this movement amount $\xi$ electrically, deviating the follow-up position of the above vertical follow-up system in response to this detected amount, and twisting the suspension wire 3, it is possible to provide a predetermined damping action.

Figure 6:
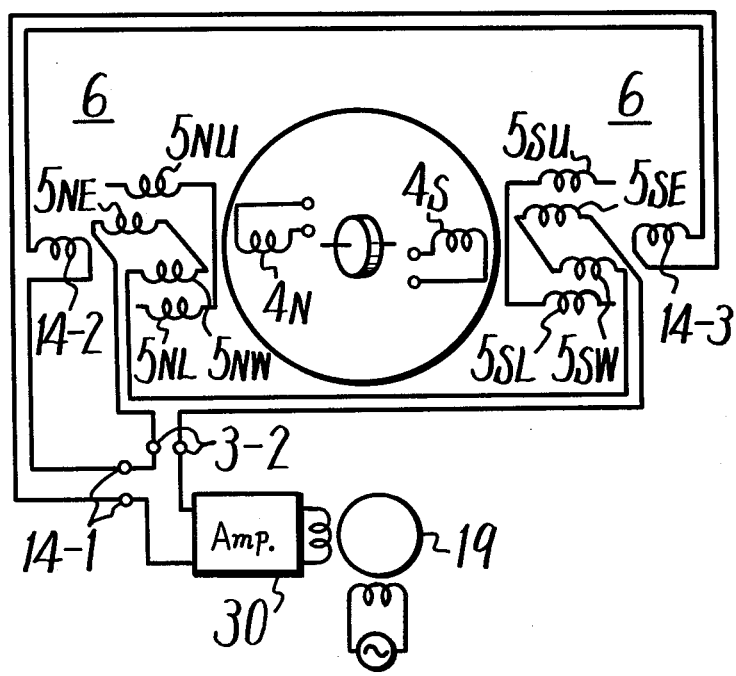
FIG. 6 is a schematic view of an apparatus for providing a damping action to the gyro.

By the way, FIG. 6 schematically shows one of the practical examples of the damping action control apparatus of gyrocompass for implementing the above principle in which at the south and north sides of the secondary coils 5N and 5S of the non-contact displacement detection apparatus 6 are additionally provided a pair of new coils 14-2 and 14-3 in such a manner that the respective winding surfaces of their coils may be in parallel to those of two pairs of coils 5NE, 5NW and 5SE, 5SW. After these coils 14-2 and 14-3 are differentially connected each other and the output terminals 14-1 of the coils 14-2 and 14-3 are coupled in series to each of signal terminals 3-2 of the vertical follow-up system, the signal voltages derived therefrom are applied through the servo amplifier 30 to the control winding of the azimuth servo motor 19. In this case, the vertical follow-up system produces the servo error whose amount is identical to the signal voltage at the output terminals 14-1 proportional to the movement amount $\xi$, so that the container 2 and the gyro case 1 have the deviation angle equivalent to the amount of the signal voltage at the output terminals 14-1. Thus the suspension wire 3 is twisted in proportion to the movement amount $\xi$, and since this twisting torque is in proportion to the movement amount $\xi$, it is in proportion to the inclination angle $\theta$ of the gyro spin axis, so that it is possible to provide the damping action to the gyro.

On the other hand, since the damping oil 7 with the high viscosity is filled or sealed between the gyro case 1 and the container 2 in order to prevent the rolling or pitching error from occurring, if in response to the movement amount $\xi$ the container 2 is twised relative to the gyro case 1 around the vertical axis, in addition to the suspension wire torque as the original torque which is capable of the damping action, the viscosity torque proportional to the angular velocity of the twisting angle is applied to the vertical axis of the gyro by the damping oil 7 with high viscosity as described above.

Figure 7:
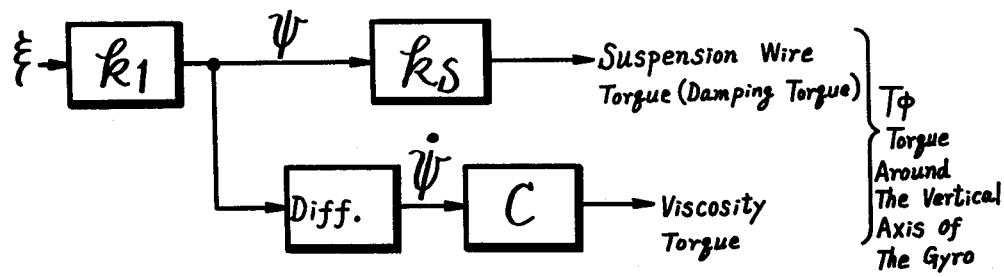
FIG. 7 is a schematic block view of a mechanism which causes a horizontal error in the gyro.

FIG. 7 is a block diagram showing the mechanism of the aforesaid damping apparatus, in which the movement amount ξ is multiplied by a proportional constant $k_1$ to produce an angle of deviation ψ which is multiplied by a suspension wire torque constant $k_s$ to make a vertical axis torque (damping torque) $T_\phi$. At the same time, the angular velocity ψ̇, which is a time differential of the angle of deviation ψ, is multiplied by a viscosity torque constant C to produce the viscosity torque and this viscosity torque is applied to the gyro as the external disturbance torque. Since this viscosity torque is of a differential type, the external disturbance caused by the acceleration of a relatively high frequency such as when a ship makes a turning motion affects badly on the damping system of the gyrocompass to cause a particularly large angular deviation between the gyro case and the container, producing a horizontal error. Although this horizontal error is attenuated by the damping action inherent to the gyrocompass itself, in such process, it continues to produce the azimuth error over a long time period.

Now, an example of the gyrocompass according to the present invention, which is free from the defects inherent to the prior art, will be described.

Figure 8:
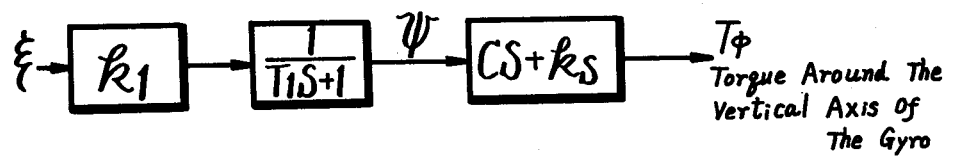
FIG. 8 is a schematic block view for showing a principle of the present invention.

In this invention, as shown in FIG. 8, a primary or first order delay element denoted by $1/T_1S+1$ (where reference letter S denotes a Laplace operator) is inserted into a signal system which forms the angle of deviation ψ in accordance with the movement amount ξ of the gyro rotor and also, a time constant $T_1$ thereof is selected to be the value which will be decided by the following operation.

$$T_1 = C/k_s \qquad (1)$$

In this case, the torque $T_\phi$ applied around the vertical axis of the gyro can be expressed as follows.

$$\begin{aligned} T_\phi &= k_s\psi + C\dot\psi \\ &= (CS + k_s)\psi \\ &= k_s \cdot \psi \left( \frac{C}{k_s} S + 1 \right) \\ &= k_1 \cdot k_s \cdot \xi \frac{1}{T_1S+1} \left( \frac{C}{k_s} S + 1 \right) \end{aligned} \qquad (2)$$

The relation between the north and south movement amount ξ and the vertical axis torque $T_\phi$ of the gyro becomes as follows by the fact that $C/k_s S+1$ of a numerator and $T_1S+1$ of a denominator, both in the above equation (2), are cancelled by each other.

$$T_\phi = k_1 \cdot k_s \cdot \xi \qquad (3)$$

Thus, the influence of the viscosity torque constant C which causes the external disturbance torque disappears completely, so that it becomes possible to make this system substantially equivalent to the system in which only the damping torque due to the suspension wire 3 required by the compass system is applied to the gyro. In other words, the vertical axis torque $T_\phi$ of the gyro is the summation of the proportional torque $k_s\cdot\psi$ caused by the suspension wire 3 and the torque $C\dot\psi$ caused by the viscosity of the damping oil, and in terms of the relation to the angle of deviation ψ, it can be expressed by the following equation in which the proportion is added to the differential.

$$T_{100} = (CS+k_s)\psi \qquad (4)$$

On the other hand, with respect to the compass system, since it is necessary that the damping torque $T_\phi$ is in proportion to the south and north movement amount ξ of the gyro rotor, in the course of forming the deviation angle Ψ from the south and north movement amount ξ, the first order delay element is provided electrically, in which its time constant is made coincient with the differential time which will be decided by $C/k_s$ so as to remove the differential torque, that is, the influence of the viscosity.

Figure 9:
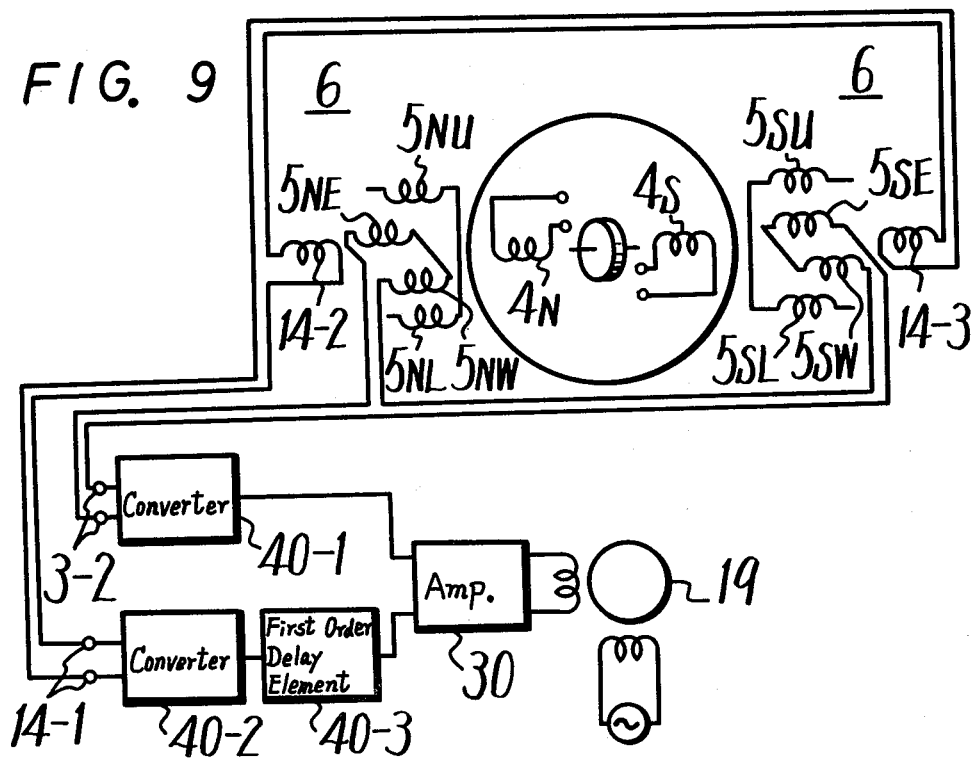
FIG. 9 is a wiring view of one example of the present invention.

FIG. 9 shows a practical example of the vertical follow-up system including the first order delay element of the present invention which corresponds to the damping apparatus in FIG. 6. In the figure, numerals 40-1 and 40-2 denote converters (demodulators) each for converting the AC output derived from the non-contact displacement detection apparatus of the azimuth and the south and north movement amount ξ into a DC signal, respectively and numeral 40-3 denotes the first order delay element such as an electrical circuitry using an operational amplifier or an R-C network connected between the converter 40-2 and the amplifier 30 in which the time constant $T_1$ is set to be equal to $C/k_s$.

As described above, in the present invention, into the course of the damping system of the azimuth is inserted the electrical first order delay element and its time constant is selected as the value in the ratio where the viscosity torque constant C between the gyro case and the container is divided by the suspension wire torque constant $k_s$, by which the influence caused by the above viscosity torque constant which is apt to occur mechanically in terms of construction even upon the turning and increase and/or decrease of the velocity of the ship or vehicle is eliminated by electrical means and hence it is possible to provide the gyrocompass with high efficiency.

An example of the first order delay element 40-3 will be now described with reference to FIG. 10.

Figure 10:
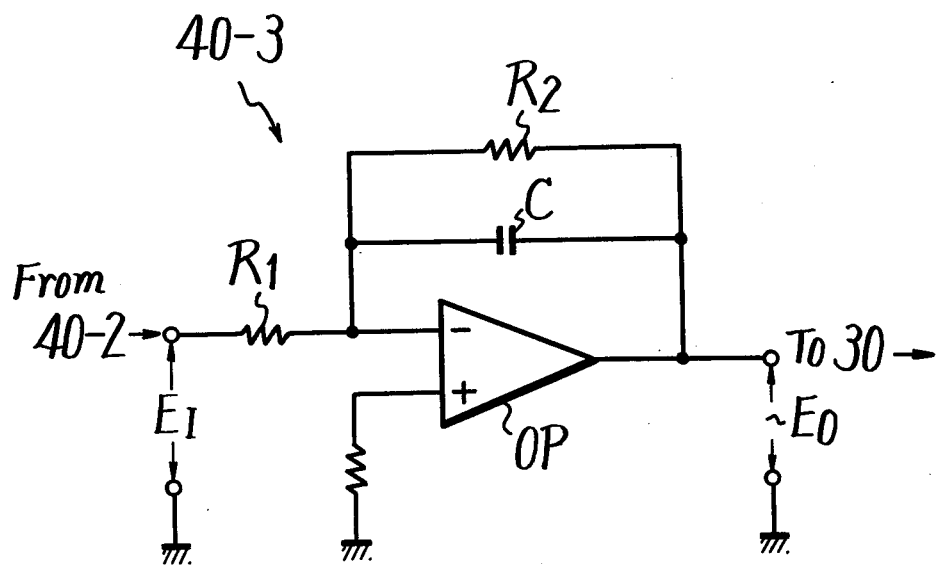
FIG. 10 a connection diagram showing an example of the first order delay element shown in FIG. 9.

In FIG. 10, reference letter OP designates an operational amplifier. The output terminal of the operational amplifier OP is connected to its inverted input terminal through a parallel connection of a resistor $R_2$ and a capacitor C, and the non-inverted input terminal of this operational amplifier OP may be grounded. The output signal from the converter 40-2 is applied through a resistor $R_1$ to the inverted input terminal of the operational amplifier OP, and the output signal from the latter is supplied to the amplifier 30.

The ratio between an input signal $E_I$ to the operational amplifier OP and an output signal $E_O$ is expressed as follows:

$$\frac{E_O}{-E_I} = \frac{R_2}{R_1} \cdot \frac{1}{T_1S+1} \qquad (5)$$

where $T_1$ is $R_2C$.

In fact, the time constant $T_1$ is selected in a range from about 200 to 500 sec.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A gyrocompass comprising:

a gyro case for housing a gyro, a spin axis of which is arranged substantially horizontal;

a container means for surrounding said gyro case and containing within it a liquid;

a first supporting means formed of a suspension wire for supporting said gyro case within said container means;

a second supporting means for supporting said container means with three degrees of freedom;

a vertical follow-up means for making said container means follow said gyro case around a vertical axis;

means for detecting a displacement of said gyro case to north and south directions relative to said container means and supplying a detected signal, supplying the detected signal to said vertical follow-up means to thereby produce a follow-up error responsive to said displacement, and twisting said suspension wire in accordance with said follow-up error so that a damping torque is applied to said gyro case;

a first order delay means through which the north and south displacement detected signal is supplied to said vertical follow-up means to produce a follow-up error therein, a time constant of said first order delay means being selected substantially equal to a ratio between a viscosity torque constant around the vertical axes of said container means and said gyro case and a torque spring constant of said suspension wire;

said first order delay means comprising an operational amplifier, and input resistance, and a feedback circuit; and said feedback circuit being formed of a resistance and a capacitance connected in parallel, said feedback circuit being connected between the output terminal of said operational amplifier and an inverted input terminal thereof.

* * * * *